United States Patent
Kim et al.

(10) Patent No.: US 11,064,388 B2
(45) Date of Patent: Jul. 13, 2021

(54) TRAFFIC DISTRIBUTION METHOD THROUGH MULTI-ACCESS NETWORK IN A NETWORK AND NETWORK ENTITY PERFORMING THE SAME

(71) Applicant: ELECTRONICS AND TELECOMMUNICATIONS RESEARCH INSTITUTE, Daejeon (KR)

(72) Inventors: Changki Kim, Daejeon (KR); Yoo Hwa Kang, Daejeon (KR); Jeoung Lak Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/407,450

(22) Filed: May 9, 2019

(65) Prior Publication Data

US 2019/0357082 A1    Nov. 21, 2019

(30) Foreign Application Priority Data

May 21, 2018  (KR) .................. 10-2018-0057838
Apr. 29, 2019  (KR) .................. 10-2019-0049977

(51) Int. Cl.
*H04L 12/26* (2006.01)
*H04W 28/08* (2009.01)
(Continued)

(52) U.S. Cl.
CPC .......... *H04W 28/08* (2013.01); *H04M 15/66* (2013.01); *H04W 8/08* (2013.01); *H04W 80/10* (2013.01)

(58) Field of Classification Search
CPC .... H04L 12/14; H04L 12/1407; H04M 15/00; H04M 15/66; H04W 28/08; H04W 4/24;
(Continued)

(56) References Cited

U.S. PATENT DOCUMENTS 7,756,056 B2    7/2010  Kim et al.
8,331,940 B2   12/2012  Kim et al.
(Continued)

FOREIGN PATENT DOCUMENTS

KR    10-2016-0002304 A    1/2016

OTHER PUBLICATIONS

3rd Generation Partnership Project; Technical Specification Group Services and System Aspects; Procedures for the 5G System; Stage 2, 3GPP TS 23.502 V15.1.0 (Mar. 2018).
(Continued)

*Primary Examiner* — Minh Trang T Nguyen
(74) *Attorney, Agent, or Firm* — LRK Patent Law Firm

(57) ABSTRACT

A traffic distribution method through a multi-access network in a network and a network entity performing the same. A first device belonging to the network may trigger a change to an ATSSS (access traffic steering, switching, and splitting) rule corresponding to an established multi-access PDU session (MA PDU session) when the MA PDU session is established. A session management function (SMF) may transmit a first message including the changed ATSSS rule to an access and mobility management function (AMF).

12 Claims, 4 Drawing Sheets

(51) Int. Cl.
*H04M 15/00* (2006.01)
*H04W 8/08* (2009.01)
*H04W 80/10* (2009.01)

(58) Field of Classification Search
CPC ..... H04W 60/00; H04W 80/10; H04W 8/065; H04W 8/08
See application file for complete search history.

(56) References Cited

U.S. PATENT DOCUMENTS

| | | | |
|---|---|---|---|
| 9,913,189 B2 | 3/2018 | Tinnakornsrisuphap et al. | |
| 2017/0134986 A1 | 5/2017 | Jeong et al. | |
| 2018/0262924 A1* | 9/2018 | Dao | H04W 24/08 |
| 2018/0331944 A1* | 11/2018 | Salkintzis | H04L 45/38 |
| 2019/0306068 A1* | 10/2019 | Kiss | H04L 45/24 |
| 2020/0128471 A1* | 4/2020 | Liu | H04W 28/0268 |

OTHER PUBLICATIONS

3rd Generation Partnership Project; Technical Specification Group Services and System Aspects; Study on Access Traffic Steering, Switching and Splitting support in the 5G system architecture, 3GPP TR 23.793 V0.4.0 (Apr. 2018).

ETRI, "Updating 6.2 Solution 2 to add a procedure for Multi-Access PDU Session Modification", SA WG2 Meeting #127-Bis, S2-185001, May 28-Jun. 1, 2018, Newport Beach, USA.

ETRI, "Updating 6.2 Solution 2 to add a procedure for Multi-Access PDU Session Modification", SA WG2 Meeting #128, S2-186794, Jul. 2-6, 2018, Vilnius, Lithuania.

ETRI, "Updating 6.2 Solution 2 to add a procedure for Multi-Access PDU Session Modification", SA WG2 Meeting #128, S2-187108, Jul. 2-6, 2018, Vilnius, Lithuania.

* cited by examiner

TRAFFIC DISTRIBUTION METHOD THROUGH MULTI-ACCESS NETWORK IN A NETWORK AND NETWORK ENTITY PERFORMING THE SAME

CROSS-REFERENCE TO RELATED APPLICATION

This application claims priority to and the benefit of Korean Patent Application Nos. 10-2018-0057838 and 10-2019-0049977 filed in the Korean Intellectual Property Office on May 21, 2018 and Apr. 29, 2019, respectively, the entire contents of which are incorporated herein by reference.

BACKGROUND OF THE INVENTION

1. Field of the Invention

The present invention relates to a traffic distribution method through a multi-access network in a network, and a network entity performing the same.

2. Description of Related Art

Recently, standardization of 5G network technology has been underway. In this 5G network, the standardization work is underway to support access traffic steering, switching, and splitting (ATSSS) between a 3GPP access network and a non-3GPP access network.

Traffic steering is a procedure that selects an access network for a new data flow and transfers the traffic of this data flow over the selected access network. Traffic switching is a procedure that moves all traffic of an ongoing data flow from one access network to another access network in a way that maintains continuity of the data flow. Traffic splitting is a procedure that splits the traffic of a data flow across multiple access networks. When traffic splitting is applied to a data flow, some traffic of the data flow is transferred via one access and some other traffic of the same data flow is transferred via another access.

In order to provide traffic (data, voice, etc.) to user equipment (UE) in a 5G network, packet data unit (PDU) session establishment is required between the UE and a data network. When the service is completed, the corresponding PDU session is released.

Existing PDU session establishment is performed only through the UE and one access network (3GPP access network or non-3GPP access network), thereby establishing a single access PDU (SA PDU) session. A plurality of SA PDU sessions may be established in one UE, and the plurality of SA PDU sessions may be distinguished through PDU session identifiers, respectively. If service provision to the UE is terminated or a user traffic session needs to be changed, the established PDU session may be modified or released by triggering of the UE or the network.

However, since an existing single access PDU (SA PDU) session is established for only one access network, user traffic belonging to the corresponding PDU session may not be transmitted/received through two or more access networks. Accordingly, it is difficult to provide a service supporting the ATSSS function. To support the ATSSS function, one PDU session with a unique identifier established over two or more accesses is required. This PDU session is called a multi-access PDU (MA PDU) session.

SUMMARY OF THE INVENTION

The present invention provides a method for distributing traffic to a multi-access network in an MA PDU session established for an ATSSS function, and a network entity performing the same.

According to an exemplary embodiment of the present invention, a method for modifying a packet data unit (PDU) session in a network is provided. The method may include triggering, by a first device belonging to the network, a change to an ATSSS (access traffic steering, switching, and splitting) rule corresponding to an established multi-access PDU session (MA PDU session) when the MA PDU session is established, and transmitting, by a session management function (SMF), a first message including the changed ATSSS rule to an access and mobility management function (AMF) The method may include transmitting, by the AMF, a second message including the changed ATSSS rule to an access network, and transmitting, by the access network, the changed ATSSS rule to user equipment (UE).

The method may include generating, by the SMF, an N4 rule to be mapped to the changed ATSSS rule, and transmitting, by the SMF, an N4 session modification request message including the N4 rule to a user plane function (UPF).

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to a access type or a radio access technology, an ATSSS function indicating one of traffic distribution techniques, and a precedence indicating a priority between each ATSSS rule.

The first message may be an Namf_Communication_N1N2MessageTransfer message, the Namf_Communication_N1N2MessageTransfer message may include a PDU session modification command message, and the PDU session modification command message may include the changed ATSSS rule.

The second message may be an N2 session request message, the N2 session request message may include a PDU session modification command message, and the PDU session modification command message may include the changed ATSSS rule.

The transmitting to the UE may include performing, by the access network, resource modification with the UE, and transmitting, by the access network, a PDU session modification command message including the changed ATSSS rule to the UE.

The first device may be a policy control function (PCF).

The first device may be a unified data management (UDM).

The first device may be the SMF.

According to another exemplary embodiment of the present invention, a method for modifying a packet data unit (PDU) session in a network is provided. The method may include establishing a multi-access PDU session for an ATSSS (access traffic steering, switching, and splitting) function, triggering, by a first device, a change of an ATSSS rule when the ATSSS rule is changed, transmitting, by a session management function (SMF), a first message including the changed ATSSS rule to an access and mobility management function (AMF), and transmitting, by the AMF, a second message including the changed ATSSS rule to an access network.

The first device may be a unified data management (UDM), and the triggering may include transmitting, by the UDM, a Nudm_SDM_Notification (Network Interface UDM (Unified Data Management) SubscriberDataManagement_Notification) message to SMF.

The first device may be a policy control function (PCF), and the triggering may include modifying, by the PCF, a session management policy with the SMF.

The first device may be the SMF.

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, an ATSSS function indicating one of traffic distribution techniques, and a precedence indicating a priority between each ATSSS rule.

The first message may be an Namf_Communication_N1N2MessageTransfer message, the Namf_Communication_N1N2MessageTransfer message may include a PDU session modification command message, and the PDU session modification command message may include the changed ATSSS rule.

The second message may be an N2 session request message, the N2 session request message may include a PDU session modification command message, and the PDU session modification command message may include the changed ATSSS rule.

According to another exemplary embodiment of the present invention, a network entity that controls modification for a packet data unit (PDU) session in a network is provided. The network entity may include a processor controlling a change to an ATSSS (access traffic steering, switching, and splitting) rule corresponding to an established multi-access PDU session (MA PDU session) when the MA PDU session is established in user equipment (UE), and a network interface transmitting a PDU session modification message including the changed ATSSS rule to another network entity.

The network entity may be a session management function (SMF), and the other network entity may be an access and mobility management function (AMF).

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, an ATSSS function indicating one of traffic distribution techniques, and a precedence indicating a priority between each ATSSS rule.

According to an exemplary embodiment of the present invention, it is possible to effectively provide traffic distribution through multi-access network in the MA PDU session by the modification procedure for the ATSSS rule.

DETAILED DESCRIPTION OF THE EMBODIMENTS

Figure 1:
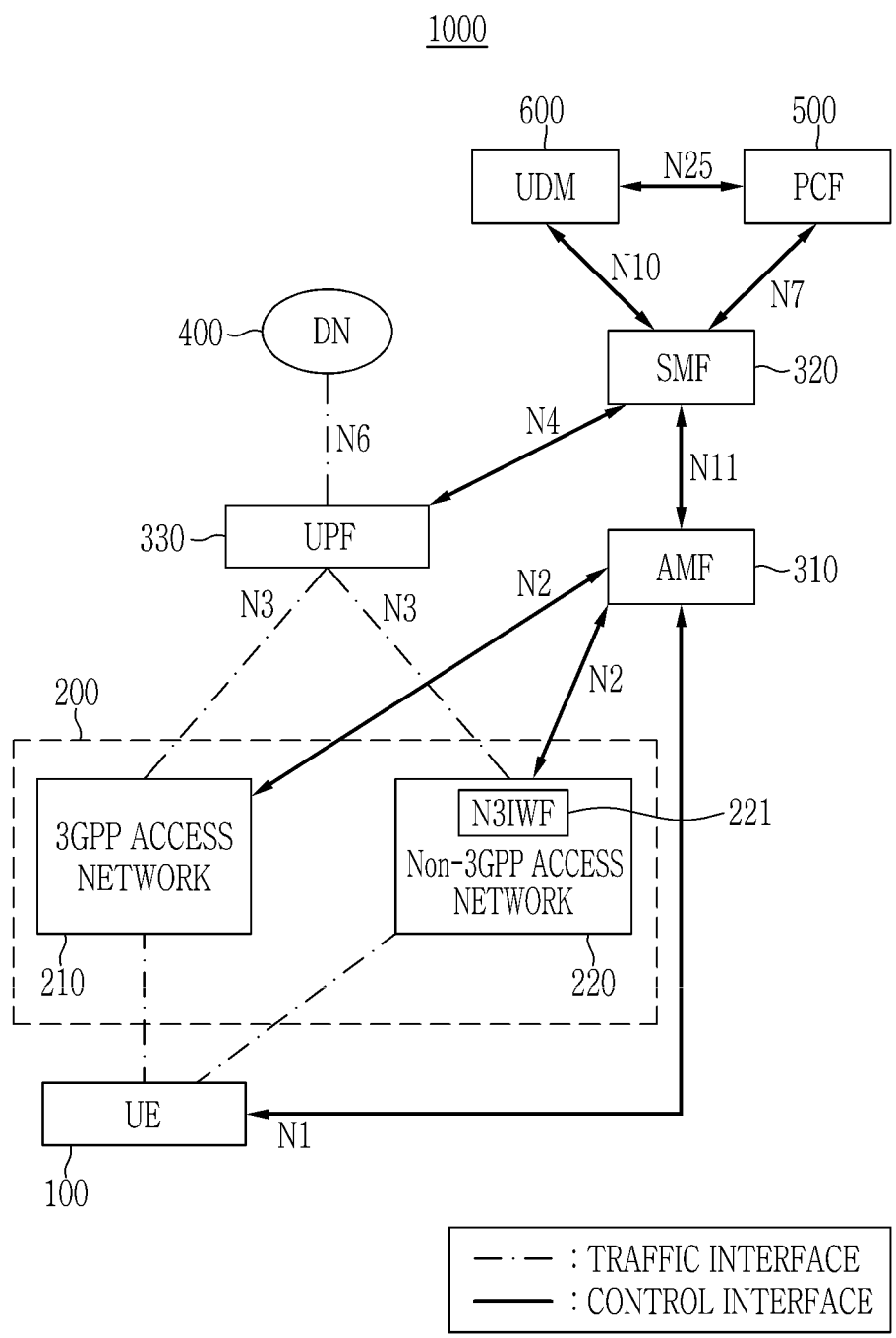
FIG. 1 is a diagram showing a 5G network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the BTS, the MMR-BS, the RS, the HR-RS, and the like.

FIG. 1 is a diagram showing a 5G network according to an exemplary embodiment of the present invention.

As shown in FIG. 1, a 5G network 1000 according to an exemplary embodiment of the present invention includes user equipment (UE) 100, an access network (AN) 200, an access and mobility management function (AMF) 310, a session management function (SMF) 320, a user plane function (UPF) 330, a data network (DN) 400, a policy control function (PCF) 500, and a unified data management (UDM) 600.

The UE 100 may access a network through the AN 200. The AN 200 includes a 3GPP access network 210 and a non-3GPP access network 220. The UE 100 may access a mobile radio access network via the 3GPP access network 210. The UE 100 may access a wireless LAN access network via the non-3GPP access network 220. The non-3GPP access network 220 includes a non-3GPP interworking function (N3IWF) 221 for N3 and N2 interfaces with the UPF 330 and the AMF 310 by a 5G core network common interface principle.

The AMF 310 and the SMF 320 are network entities that process control signals. The AMF 310 and the SMF 320 have a non-access stratum (NAS) signal interface N1 in correspondence with the UE 100. The AMF 310 performs authentication, access, and mobility control functions through the N1 interface. The SMF 320 has a session control function (establishment/modification/release for a session) through the N1 interface with the UE 100 and an N4 interface with the UPF 330, and performs a signaling procedure for traffic path establishment and traffic mobility management.

The UPF 330 is a network entity of a data plane that accommodates the multiple access networks 210 and 220 via a common N3 interface. The UPF 330 connects a data plane between the multiple access networks 210 and 220 and the DN 400 so that traffic of the UE 100 (i.e., the user) can be transmitted and received.

The UPF 330 and the access network 200 receive control rules for traffic between the UE 100 and the UPF 330 via N4 and N2 interfaces from the SMF 320, respectively, and perform functions such as traffic detection, routing, and QoS control using the received control rules.

The PCF 500 is connected to the SMF 320 through an N7 signal interface, and controls policies related to session, mobility, and QoS. The PCF 500 may transmit policy and charging control rules (PCCs) required for the SMF 320 to map into (a) ATSSS rules to the SMF 320.

The UDM 600 is connected to the SMF 320 through an N10 signal interface, and manages user information management and policy for each UE such as subscription information of the UE 100. The UDM 600 may transmit information about the profile and subscription of the UE 100 for ATSSS function to the SMF 320.

As described above, the 5G network system according to an exemplary embodiment of the present invention is an integrated structure that simultaneously accommodates the 3GPP access network 210 and the non-3GPP access network 220. When an MA PDU session is established to provide the ATSSS function between the 3GPP access network 210 and the Non-3GPP access network 220 in such an integrated structure, it may be necessary to distribute the traffic to the multi-access network in the MA PDU session. Also, in case of distributed traffic through the MA PDU session, it may be necessary to modify the existing traffic distribution transmission method depending on the network situation. To this end, an efficient session modification method for the MA PDU session is required. Hereinafter, a method for modifying an MA PDU session will be described with reference to FIG. 2.

Figure 2:
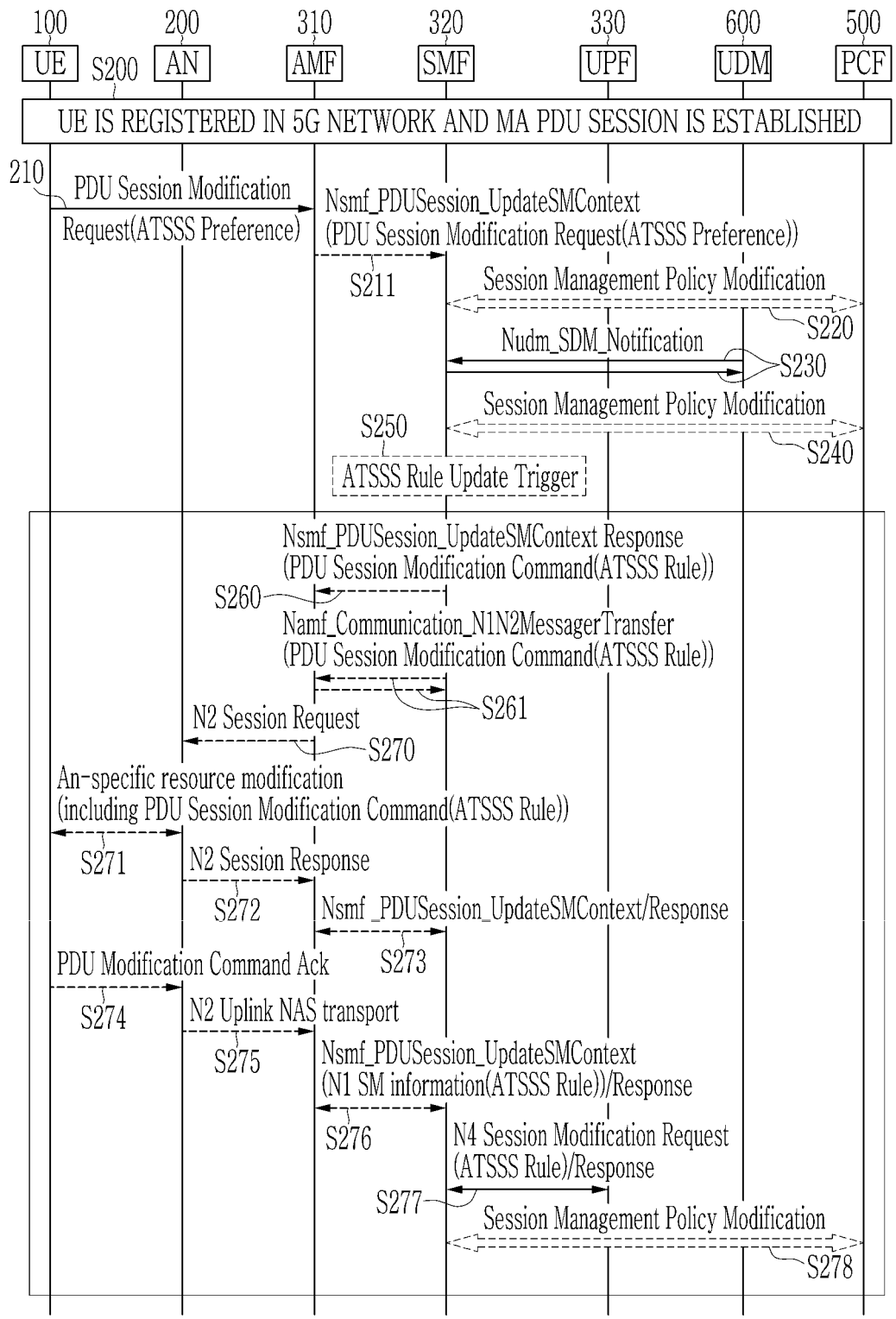
FIG. 2 is a flowchart showing a method for modifying an MA PDU session according to an exemplary embodiment of the present invention.

FIG. 2 is a flowchart showing a method for modifying an MA PDU session according to an exemplary embodiment of the present invention.

First, it is assumed in FIG. 2 that the UE 100 is already registered in the 5G network through the 3GPP access network 210 and the non-3GPP access network 220, and that an MA PDU session is created by MA PDU session establishment procedures (S200). The MA PDU session may have a unique (or the same) PDU session ID.

In the state in which the MA PDU session is established, the UE 100 triggers and requests a change of the ATSSS rule for a specific packet filter set to the core network. The core network may accept or accept by changing the ATSSS rule requested by the UE 100 in consideration of network conditions, and transmit the determined ATSSS rule (i.e. the accepted ATSSS rule or the changed ATSSS rule) to the UE 100. This procedure is S210, S211, S240, S260, and S270 to S278 described below.

Meanwhile, the ATSSS rule, which is triggered and changed by the core network instead of the UE 100, may be transmitted to the UE 100 and the UPF 330. This procedure is S220, S230, S261, and S270 to S278 described below. That is, steps S270 to S278 are performed in common both when triggered by the UE 100 and when triggered by the core network.

First, a procedure of triggering by the UE 100 will be described. The UE 100 transmits a PDU session modification request message to the AMF 310 via the access network 200 when the ATSSS rule needs to be changed (S210). The PDU session modification request message is an N1 NAS message, and includes an ATSSS preference and a PDU session ID. Here, the ATSSS preference is the same format as the ATSSS rule received from the network at the time of establishing the MA PDU session. The ATSSS preference indicates a changed ATSSS rule that the UE 100 requests to the network when the UE needs to change the existing ATSSS rule. For example, the ATSSS preference may be content requesting that a specific packet be transmitted simultaneously via the 3GPP access network 210 and the non-3GPP access network 200. Alternatively, the ATSSS preference may be a content requesting a change to the details of the existing ATSSS rule.

When receiving the PDU session modification request message in step S210, the AMF 310 transmits an Nsmf_PDUSession_UpdateSMContext message to the SMF 320 through the N11 interface (S211). The Nsmf_PDUSession_UpdateSMContext message includes the PDU session modification request message and the PDU session ID received in step S210.

When receiving the Nsmf_PDUSession_UpdateSMContext message in step S211, the SMF 320 performs a session management policy modification with the PCF 500 (S240). Here, the PCF 500 evaluates the ATSSS preference requested by the UE 100 based on a session management policy and performs the change of the ATSSS rule. The PCF 500 informs the SMF 320 of the changed ATSSS rule.

After step S240, the SMF 320 transmits an Nsmf_PDUSession_UpdateSMContext response message to the AMF 310 via the N11 interface (S260). Here, the Nsmf_PDUSession_UpdateSMContext response message includes a PDU session modification command, and the PDU session modification command includes the changed ATSSS rule. The PDU session modification command is a message to be transmitted from the SMF 320 to the UE 100, and is carried on an N1 SM container.

Next, a procedure for the core network to trigger and transmit the changed ATSSS rule to the UE 100 and the UPF 330 will be described. The change of the ATSSS rule by triggering the core network may be triggered by the UDM 600, the PCF 500, and the SMF 320.

The UDM 600 manages the MA PDU session information and the like of the subscriber, and the UDM 600 can trigger the change of the ATSSS rule when the subscriber profile related to the ATSSS is changed. When it is triggered by the UDM 600, the UDM transmits a Nudm_SDM_Notification (Network Interface UDM (Unified Data Management) SubscriberDataManagement_Notification) message to the SMF 320 (S230). That is, the UDM 600 triggers to update the ATSSS rule of the subscription data of the SMF 320 by transmitting a Nudm_SDM_Notification message to the SMF 320. The Nudm_SDM_Notification message includes session management subscription data. The SMF 320 updates the received session management subscription data and transmits an ACK (acknowledgment) message to the UDM 600 (S230).

The PCF 500 manages a Policy and Charging Control (PCC) rule necessary for generating an ATSSS rule, and the PCF 500 can trigger the change of the ATSSS rule. When triggered by the PCF 500, the PCF 500 performs a session management policy modification procedure with the SMF 320 (S220). That is, when the PCF 500 wants to change the ATSSS rule, the PCF 500 transmits a PCC rule necessary for changing the ATSSS rule to the SMF 320 using the session management policy modification procedure (S220).

Triggering by the SMF 320 occurs when the SMF 320 changes the ATSSS rule according to a local policy (S250).

When the triggering by the core network is performed as in the procedures of S220, S230, and S250, the SMF 320 transmits a Namf_Communication_N1N2MessageTransfer message to the AMF 310 via the N11 interface (S261). The Namf_Communication_N1N2MessageTransfer message includes a PDU Session Modification Command, and the PDU session modification command includes the changed ATSSS rule. The PDU session modification command is a message to be transmitted from the SMF 320 to the UE 100, and is carried on an N1 SM container.

Meanwhile, the change of the ATSSS rule by the triggering of the UE 100 and the change of the ATSSS rule by the triggering of the core network described above perform the following steps S270 to S278 in common. Hereinafter, this will be described in detail.

The AMF 310 transmits an N2 session request message to the access network 200 (S270). The N2 session request message includes the PDU session modification command message received in step S260 or S261, and the PDU session modification command message includes the changed ATSSS rule. The access network 200 receiving the N2 session request message in step S270 performs resource modification with the UE 100 (S271). In step S271, a PDU session modification command message, which is an N1 NAS message requesting modification of the PDU session, is transmitted to the UE 100. The PDU session modification command message includes the changed ATSSS rule. Meanwhile, the access network 200 transmits an N2 session response message, which is a response message to the N2 session request message received in step S270, to the AMF 310 (S272). The AMF 310 transmits the Nsmf_PDUSession_UpdateSMContext message to the SMF 320, and receives the Nsmf_PDUSession_UpdateSMContext response message from the SMF 320 (S273). Here, the Nsmf_PDUSession_UpdateSMContext message includes N2 SM information (for example, AN tunnel information) and location information of the UE.

The UE 100 receiving the PDU session modification command, which is the N1 SM (Session Management) NAS message, applies the received changed ATSSS rule in step S217. In response to the PDU session modification command, the UE 100 transmits a PDU session modification command ACK message, which is an N1 SM NAS message, to the access network 200 (S274).

The access network 200 transmits the N1 NAS message (the PDU session modification command ACK) received from the UE 100 in step S274 to the AMF 310 through an N2 uplink NAS transport message (S275).

The AMF 310 transmits an Nsmf_PDUSession_UpdateSMContext message to the SMF 320, and receives an Nsmf_PDUSession_UpdateSMContext response message from the SMF 320 (S276). Here, the Nsmf_PDUSession_UpdateSMContext message may include the N1 SM information (N1 SM Info). The N1 SM information indicates the changed ATSSS rule, the PDU session modification command ACK, and location information of the UE.

The PDU session modification command ACK message, which is the N1 SM NAS message, is transmitted to the SMF 320 through the access network 200 and the AMF 310 by steps S274 to S276. This N1 SM NAS message may contain the entirety of the changed ATSSS rule or an ATSSS rule ID.

The SMF 320 generates an N4 rule mapped to the changed ATSSS rule, transmits the generated N4 rule to the UPF 330 through an N4 session modification request message, and receives a response to the N4 session modification request (S277).

Meanwhile, when the ATSSS rule is changed by the triggering of the PCF 500, the SMF 320 notifies the completion of the ATSSS rule change to the PCF 500 through a session management policy modification procedure with the PCF 500 (S278).

If the distribution rate of traffic is spread over the multi-access network according to the changed ATSSS rule, steps S260 to S278 may be performed once again through another access network.

Figure 3:
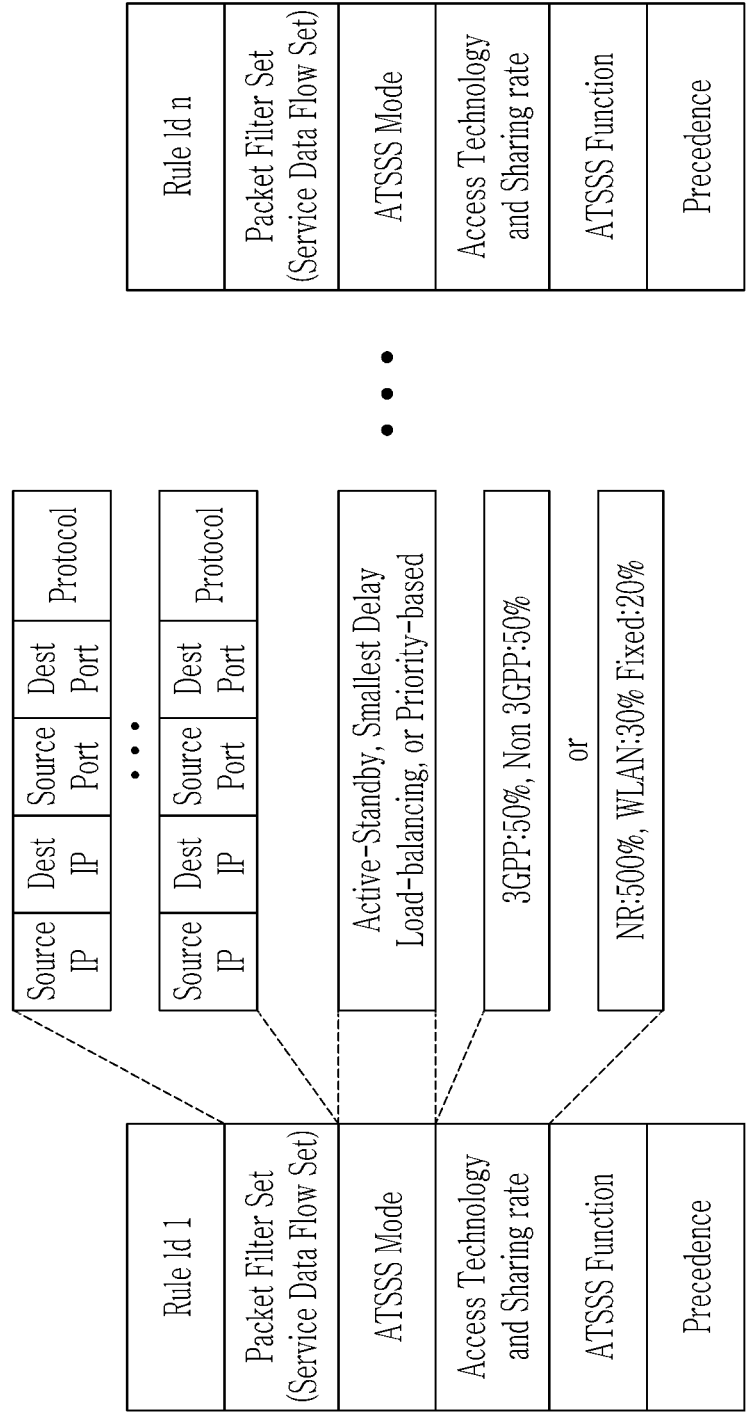
FIG. 3 is a diagram showing an ATSSS rule according to an exemplary embodiment of the present invention.

FIG. 3 is a diagram showing an ATSSS rule according to an exemplary embodiment of the present invention.

As shown in FIG. 3, the ATSSS rule includes a rule identifier (Rule Id), a packet filter set, an ATSSS mode, an access technology and sharing rate, an ATSSS function, and a precedence.

The rule identifier (ID) is an identifier that distinguishes the ATSSS rule.

The packet filter set indicates a set of service data flow (SDF) of a packet to which the ATSSS rule is applied, and the SDF may include an IP address, a port, a protocol, and the like.

The ATSSS mode indicates the mode of application for ATSSS operation between access networks. This ATSSS mode indicates one of an active-standby mode, a smallest delay mode, a load-balancing mode, and a priority-based mode. When one access is active and then unavailable, the active-standby mode is a mode in which other access that is in standby is operated. The smallest delay mode is a mode in which an access with a small delay is selected and operated based on the delay measured between the UE and the network. The load-balancing mode is a mode in which two accesses are used according to a divided ratio. The priority-based mode is a mode in which a predefined priority access is used in two accesses, and other access is used when congestion occurs in the priority access.

The access technology and sharing ratio indicates the traffic distribution ratio corresponding to the access type or the RAT (Radio Access Technology) type according to the ATSSS mode.

The ATSSS function indicates one of various traffic distribution techniques. For example, the ATSSS function indicates one of a number of steering functions (such as MPTCP or ATSSS-LL). Here, the MPTCP indicates that the multi-path TCP based on the existing IETF standard is used between the UE and the UPF, and the ATSSS-LL is the ATSSS-lower layer, which is newly implemented in the UE and the UPF.

Meanwhile, the precedence indicates the priority among the ATSSS rules.

Figure 4:
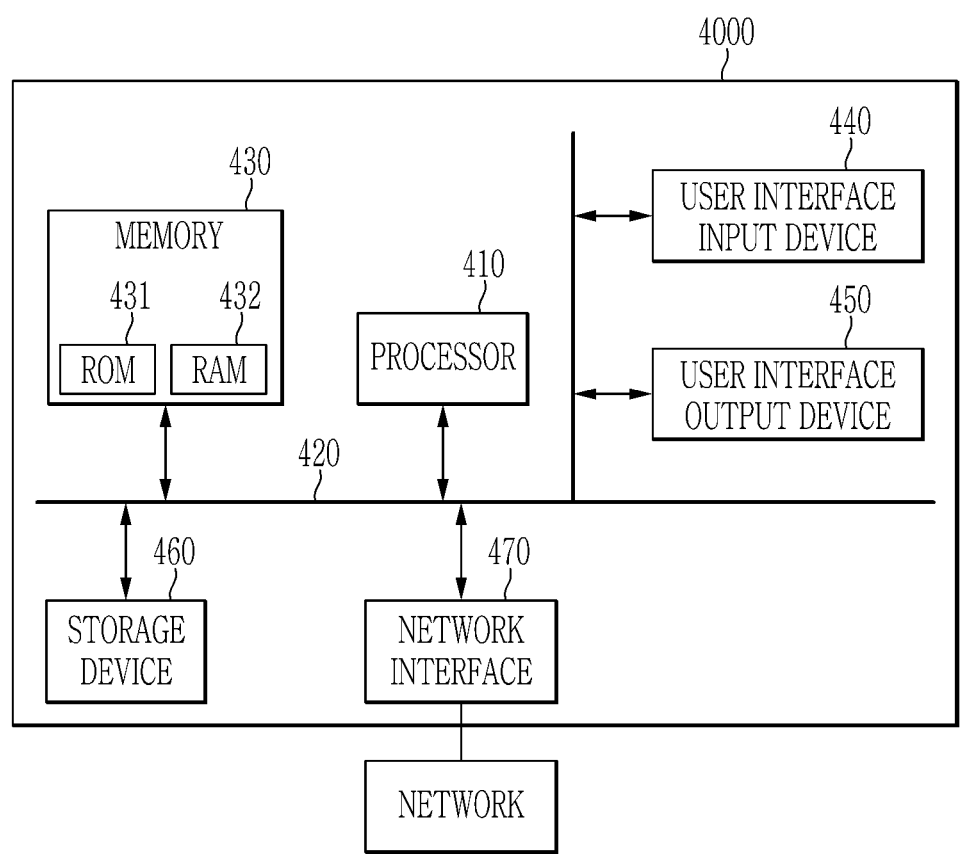
FIG. 4 is a diagram showing a computing system according to an exemplary embodiment of the present invention.

FIG. 4 is a diagram showing a computing system according to an exemplary embodiment of the present invention.

The computer system 4000 of FIG. 4 may be the AMF 310, the SMF 320, the UPF 330, the DN 400, the PCF 500, or the UDM 600 of FIG. 1. The UE 100, the access network 200, the AMF 310, the SMF 320, the UPF 330, the DN 400, the PCF 500, or the UDM 600 may be implemented as a computer system, for example, a computer readable medium.

The computer system 4000 includes at least one of a processor 410, a memory 430, a user interface input device 440, a user interface output device 450, and a storage device 460, that communicate via a bus 420. The computer system 4000 may also include a network interface 470 coupled to a network. The network interface 470 may transmit or receive signals with other entities over the network.

The processor 410 may be a central processing (CPU) or a semiconductor device that executes instructions stored in the memory 430 or the storage device 460. The processor

410 may be configured to implement the functions and methods described in FIG. 1 to FIG. 3.

The memory 430 and the storage device 460 may include various forms of volatile or non-volatile storage media. For example, the memory 430 may include a read only memory (ROM) 431 and a random access memory (RAM) 432. In an exemplary embodiment of the present invention, the memory 430 may be located inside or outside the processor 410, and the memory 430 may be coupled to the processor 410 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of modifying a packet data unit (PDU) session by a session management function (SMF) in a network, the method comprising:
deciding, by the SMF, to change to an ATSSS (access traffic steering, switching, and splitting) rule corresponding to an established multi-access PDU session (MA PDU session) when the MA PDU session is established;
transmitting, by the SMF, a first message including the changed ATSSS rule to an access and mobility management function (AMF);
generating, by the SMF, an N4 rule to be mapped to the changed ATSSS rule; and
transmitting, by the SMF, an N4 session modification request message including the N4 rule to a user plane function (UPF),
wherein the changed ATSSS rule includes an ATSSS mode indicating an application mode for ATSSS operation,
the ATSSS mode includes a smallest delay mode, a load-balancing mode, or a priority-based mode, and
the changed ATSSS rule further includes a sharing ratio indicating a traffic distribution ratio corresponding to access types when the ATSSS mode is the load-balancing.

2. The method of claim 1, wherein the changed ATSSS rule transmitted to the AMF is transferred to an user equipment (UE).

3. The method of claim 1, wherein the changed ATS SS rule further includes a rule identifier, a packet filter set indicating a set of service data flows, an ATSSS function indicating one of traffic distribution techniques, and a precedence indicating a priority between each ATS SS rule.

4. The method of claim 1, wherein:
the first message is an Namf_Communication_N1N2MessageTransfer message,
the Namf_Communication_N1N2MessageTransfer message includes a PDU session modification command message, and
the PDU session modification command message includes the changed ATSSS rule.

5. The method of claim 2, wherein:
an N2 session request message including a PDU session modification command message is transmitted to an access network, and
the PDU session modification command message includes the changed ATSSS rule.

6. The method of claim 2, wherein a PDU session modification command message including the changed ATSSS rule is transferred to the UE.

7. The method of claim 1, further comprising receiving a request message to change an ATSSS rule from network entity(ties).

8. The method of claim 7, wherein:
the network entity is a unified data management (UDM), and
the request message is a Nudm_SDM_Notification (Network Interface UDM (Unified Data Management) SubscriberDataManagement_Notification) message.

9. The method of claim 7, wherein:
the network entity is a policy control function (PCF), and
the request message includes modifying a session management policy related to the ATSSS rule.

10. A session management function (SMF) that controls modification for a packet data unit (PDU) session in a network, the SMF comprising:
a processor deciding to change an ATSSS (access traffic steering, switching, and splitting) rule corresponding to an established multi-access PDU session (MA PDU session) when the MA PDU session is established; and
a network interface transmitting a first message including the changed ATSSS rule to an access and mobility management function (AMF),
wherein the processor generates an N4 rule to be mapped to the changed ATSSS rule and the network interface transmits an N4 session modification request message including the N4 rule to a user plane function (UPF), and
wherein the changed ATSSS rule includes an ATSSS mode indicating an application mode for ATSSS operation, the ATSSS mode includes a smallest delay mode, a load-balancing mode, or a priority-based mode, and the changed ATSSS rule further includes a sharing ratio indicating a traffic distribution ratio corresponding to access types when the ATSSS mode is the load balancing.

11. The SMF of claim 10, wherein the changed ATSSS rule includes a rule identifier, a packet filter set indicating a set of service data flows, an ATSSS function indicating one of traffic distribution techniques, and a precedence indicating a priority between each ATSSS rule.

12. The SMF of claim 10, wherein:
the first message is an Namf_Communication_N1N2MessageTransfer message,
the Namf_Communication_N1N2MessageTransfer message includes a PDU session modification command message, and
the PDU session modification command message includes the changed ATSSS rule.

\* \* \* \* \*